(12) United States Patent
Eckerson et al.

(10) Patent No.: US 11,211,821 B2
(45) Date of Patent: *Dec. 28, 2021

(54) WIRELESS POWER APPARATUS, SYSTEM AND METHOD

(71) Applicant: Jabil Inc., St. Petersburg, FL (US)

(72) Inventors: David M. Eckerson, St. Petersburg, FL (US); Ronald Beebe, St. Petersburg, FL (US); Christopher D. Compton, St. Petersburg, FL (US)

(73) Assignee: JABIL INC., St. Petersburg, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/659,081

(22) Filed: Oct. 21, 2019

(65) Prior Publication Data
US 2020/0119589 A1 Apr. 16, 2020

Related U.S. Application Data

(63) Continuation of application No. 14/671,508, filed on Mar. 27, 2015, now Pat. No. 10,454,307.

(60) Provisional application No. 62/033,046, filed on Aug. 4, 2014.

(51) Int. Cl.
*H02J 50/12* (2016.01)
*H02J 50/80* (2016.01)
*H05B 6/12* (2006.01)
*H02J 50/40* (2016.01)
*H02J 7/02* (2016.01)
*H02J 50/10* (2016.01)

(52) U.S. Cl.
CPC ............. *H02J 50/12* (2016.02); *H02J 7/025* (2013.01); *H02J 50/10* (2016.02); *H02J 50/40* (2016.02); *H02J 50/80* (2016.02); *H05B 6/1236* (2013.01); *Y02B 40/00* (2013.01)

(58) Field of Classification Search
CPC . H01F 38/14; H02J 5/005; H02J 7/025; H02J 17/00; H02J 50/10; H02J 50/12; H02J 50/80; H02J 50/90; H04B 5/0037; H04B 5/0075; H05B 6/1236; Y02B 40/00
USPC .......................................................... 307/104
See application file for complete search history.

(56) References Cited

U.S. PATENT DOCUMENTS

| | | | |
|---|---|---|---|
| 8,487,480 B1 * | 7/2013 | Kesler | H01F 38/14 |
| | | | 307/104 |
| 8,754,351 B2 * | 6/2014 | England | H05B 6/062 |
| | | | 219/620 |
| 9,537,353 B1 * | 1/2017 | Bossetti | H02J 7/025 |

\* cited by examiner

*Primary Examiner* — Levi Gannon
(74) *Attorney, Agent, or Firm* — Thomas J. McWilliams; Barnes & Thornburg LLP

(57) ABSTRACT

An apparatus, system and method for wirelessly powering a device. The apparatus, system and method may include a primary coil housing that houses a primary coil; a secondary coil housed within the device and suitable for having power induced therein responsive to the primary coil; an isolator that at least partially mechanically and electrically isolates the primary coil from the secondary coil; and a plurality of paired feedback sensors respectively communicatively and physically associated with, and paired as between, the primary coil housing and the device, wherein the plurality of paired feedback sensors exchanges indications regarding performance of the secondary coil, and wherein performance of the primary coil is modified responsively to the indications.

15 Claims, 16 Drawing Sheets

WIRELESS POWER APPARATUS, SYSTEM AND METHOD

CROSS-REFERENCE TO RELATED APPLICATIONS

This application is a continuation application of Non-Provisional application Ser. No. 14/671,508, filed Mar. 27, 2015, entitled "Wireless Power Apparatus, System and Method", which claims priority to U.S. Provisional Application No. 62/033,046, filed on Aug. 4, 2014, entitled "Wireless Power", the entirety of which are incorporated herein by reference.

BACKGROUND

Field of the Disclosure

The field of the disclosure is power, and, more particularly, is an apparatus, system and method for providing wireless power.

Background of the Disclosure

Modern electrical appliances typically receive operative power via a coupling to a source of alternating current at a fairly constant frequency and voltage. For example, electrical wiring and power outlets are commonly provided in the United States to deliver electrical power at a frequency of 60 Hz, a voltage of 120 or 240 volts, and a current determined by the power needs of the appliance. The circuits that provide such power are typically referred to as "mains circuits" or "primary supplies." Primary supply parameters different from the foregoing may be common in other countries. For example, in some countries 50 Hz is a common power supply frequency.

In general, to provide power to an electrical appliance, the internal wiring of the appliance is coupled to a power cord terminating in a plug with two (or more) prongs. The plug is coupled ("plugged in") to a power outlet receiving primary supply power, where the prongs each contact a different electrical conductor with a voltage difference therebetween. The voltage difference across the prongs causes current to flow through the appliance wiring and provides power to operate the appliance.

However, the use of electrical plugs and appliance cords, and the need to mate the two in order to power the appliance, provides significant drawbacks. These issues include inconvenient concentration of appliances near a plug, the frequent need to unplug one appliance to enable use of another, the possibility of overload, etc.

Therefore, to address these and other issues, the need exists for an apparatus, system, and method of providing, monitoring and controlling wireless power.

SUMMARY OF THE DISCLOSURE

The disclosure includes, in part, exemplary embodiments of an apparatus, system and method for receiving power at an appliance. An exemplary apparatus, system and method may include a secondary coil within a housing physically associated with the appliance and suitable for providing induced operative current from a primary coil magnetically proximate to, and at least partially isolated from, the secondary coil; an appliance controller coupled to the secondary coil and suitable to receive an indication of at least one of a shape, frequency, and magnitude of an operative waveform to be provided to the appliance, and suitable to generate data indicators according to the indication; and at least one sensor, such as an infrared transmitter, communicatively coupled to the appliance controller and suitable to receive ones of the data indicators from the appliance controller and to transmit the ones of the data indicators wirelessly to at least one data receiver associated with the primary coil to stimulate operation of the primary coil to produce the operative waveform in the secondary coil. The disclosed embodiments may further include a secondary sensor communicatively coupled to the appliance controller and suitable to transmit other ones of the data indicators.

The disclosure also includes, in part, exemplary embodiments of an apparatus, system and method for providing power to an appliance. The apparatus, system and method may include a primary coil within a housing that is physically separate from, and that at least partially provides mechanical and electrical isolation from, a secondary coil physically associated with the appliance, wherein the primary coil is suitable for inducing a current in the secondary coil when magnetically proximate to the second coil; a primary coil controller coupled to the primary coil within the housing and suitable to indicate a primary coil waveform to be provided at the primary coil; and a feedback receiver within the housing which is suitable to receive feedback data regarding a secondary coil waveform induced in the secondary coil responsively to the primary coil waveform, and to modify the primary coil waveform responsively to the feedback data.

The disclosed exemplary embodiments further include an apparatus, system and method for wirelessly powering a device. The apparatus, system and method may include a primary coil housing that houses a primary coil; a secondary coil housed within the device and suitable for having power induced therein responsive to the primary coil; an isolator that at least partially mechanically and electrically isolates the primary coil from the secondary coil; and a plurality of paired feedback sensors respectively communicatively and physically associated with, and paired as between, the primary coil housing and the device, wherein the plurality of paired feedback sensors exchanges indications regarding performance of the secondary coil, and wherein performance of the primary coil is modified responsively to the indications.

An exemplary primary coil housing may be a cooktop, a countertop, a tabletop, or a standalone housing. The induced power may be in the range of 1 W to 10 W, or in the range of 1 kW to 4.5 kW, by way of non-limiting example.

Thus, the disclosed exemplary embodiments provide an apparatus, system, and method of providing, monitoring and controlling wireless power.

BRIEF DESCRIPTION OF THE FIGURES

Understanding of the present disclosure will be facilitated by consideration of the following detailed description of the embodiments taken in conjunction with the accompanying drawings, in which like numerals refer to like parts, and in which.

DETAILED DESCRIPTION OF THE EMBODIMENTS

Figure 1:
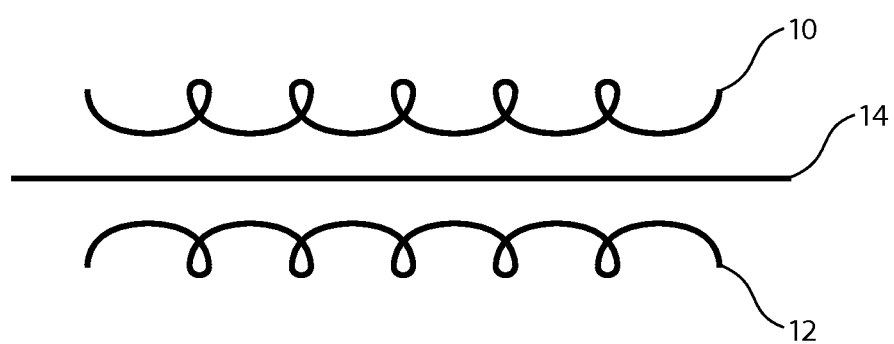
FIG. 1 illustrates an induction power system.

It is to be understood that the figures and descriptions of the present disclosure have been simplified to illustrate elements that are relevant for a clear understanding of the disclosure, while eliminating, for the purpose of clarity and brevity, many other elements found in similar apparatuses, systems, and methods. Those of ordinary skill in the art may recognize that other elements and/or steps are desirable and/or required in implementing the presently disclosed embodiments. However, because such elements and steps are well known in the art, and because they do not facilitate a better understanding of the present disclosure, a discussion of such elements and steps is not provided herein. Nevertheless, the disclosure herein is directed to all such variations and modifications to the disclosed elements and methods known to those skilled in the art.

Wireless power has become increasingly popular with the advent of an increasingly mobile society. Wireless power may at least partially untether devices that previously required plugging into a primary supply, and this untethering allows for use of these devices in a variety of heretofore unavailable settings. In fact, as wireless fidelity ("WiFi"), Bluetooth, cellular, near-field communications ("NFC"), and like wireless intercommunications have proliferated, it is still device power wiring that provides an impediment to true and complete mobility of devices. By way of non-limiting example, an electric frying pan, blender, pot, can opener, coffee maker, cooler, chiller, juicer, waffle or Panini iron, or the like would be appreciably easier to operate, handle and move, store, and clean without the presence of a wire for operative power. Moreover, rather than necessitating a particular space for each of the foregoing appliances, the use of wireless operative power for the aforementioned appliances could be conveniently made available in many locations throughout a kitchen, dining room, living room, or retail food setting, such on countertops, table tops, stand-alones, on board corded-appliances, or on cooktops having integrated inductive power sources.

Wireless power, in general, may be considered in two basic categories, namely wireless charging and wireless operative power. Wireless charging is typically a low-power operation, on the order of 10 W or less, such as more particularly in the range of about 5 W or less, and may be provided through inductive (i.e., magnetic field) wireless charging, although some efforts have been made to provide such charging using radio frequency ("RF") techniques. Operative power demands are often much more significant than those power demands for wireless or wired charging, such as recharging or so-called "trickle charging." For example, operative power requirements may vary from the 100 W range for small appliances to the 1-3 kW range for more significant movable appliances, such as those movable appliances that require significant heating for operation.

Nevertheless, even these more significant operative power requirements may be wirelessly provided using inductive coupling. For example, some modern kitchens are equipped with a stovetop having an induction system that conveys energy to a cooking utensil with a high magnetic permeability, such as a steel saucepan. An induction coil generates a strong oscillating magnetic field, which induces eddy currents in the utensil that heat it enough to cook with. However, it has been theorized that such an induction element may be used to inductively provide power to a kitchen appliance such as a blender, mixer, or the like, instead of requiring that the appliance be plugged into the main power supply. In such exemplary instances, the power available for inductive transfer to meet the more significant operative power demands of an inductive secondary coil placed in proximity to the primary coil is limited by the power supply voltage. For example, the maximum available inductive power using presently known techniques is typically on the order of 1.5 kW at 100V, and is on the order of 4.5 kW at 250V.

Further, known techniques for wireless charging oftentimes do not necessitate an indication of the presence of a device to activate, in part due to the less significant nature of the magnetically-induced power provided for charging power, as compared to operative power. However, in an operative power embodiment, the amount of power, because it is variable and may be significant in accordance with the device to be operated, should be known and monitored during operation.

Suggested solutions to indicate presence for the inductive provision of operative power include static presence detection, RF feedback and switching (such as at 27 MHz), Bluetooth feedback and switching, visible light switching, and NFC feedback and switching. However, each of the immediately foregoing solutions, if used alone, may suffer from drawbacks, such as cost, measurement tolerance, suitability for use in certain embodiments, consistency of operation, interference from the inductive power system, etc. Moreover, the foregoing methods, when used alone, may lack suitability to provide continuous feedback and refined control of the specific power requirements for particular powered devices.

The present disclosure includes an apparatus, system and method for providing, monitoring and controlling wireless power. The present disclosure may provide: trickle charging and/or battery recharging, such as for battery operated kitchen appliances; power conversion; and/or operative power to any device or appliance, such as blenders, toasters and toaster ovens, coffee makers, mobile/cellular devices, laptops, frying pans, pots, can openers, grills, hibachis, coolers, chillers, juicers, fondue pots, cooktops, pizza ovens, waffle or Panini irons, or the like. The availability of wireless power according to the disclosed exemplary embodiments may eliminate clutter in kitchens, dining rooms, conference rooms (i.e., using wireless laptop charging power or computer monitor operative power from a conference table), and the like, may save significant space in these and other areas, and may make far easier the cleaning and storage of appliances, etc. For example, a cordless appliance may, in certain instances and in addition to receiving wireless operative and/or recharging power, be completely or partially sealed and/or otherwise waterproofed, thereby making cleaning of the appliance in one or few pieces much easier than in the known art.

Wireless power for the aforementioned charging, power conversion, or operation may be conveniently provided, such as using induction, on any surface or device suitable to provide feedback electronics and inductive power, and/or suitable to provide inductive power and interfacing electronics for interfacing with feedback at least partially provided by the device that receives the wirelessly provided power. Such housings for primary, or "wired," power may include, but are not limited to, countertops, table tops, standalones, corded-appliances, or inductive cooktops. Of course, those skilled in the art will appreciate, in light of the discussion herein, that the power (such as from a mains supply) that powers a primary inductive coil, as used herein, may also be provided by a battery or other suitable power source (such as car, camper, boat, or similar batteries, by way of non-limiting example).

FIG. 1 is a schematic diagram illustrating the exemplary generation of power in a secondary coil 10. In the illustration, current is generated in the secondary 10 due to a magnetic field caused by current flowing in the primary coil 12. In the illustration, an isolation barrier 14 is present between the primary 12 and secondary 10. In certain embodiments, the isolation barrier 14 may be, for example, the glass atop an inductive cooktop.

Dependent upon the wired power available to the primary 12, the wireless induction power provided to the secondary 10 in the disclosed embodiments may be in the range of less than 10 W, such as 1-5 W, to greater than 4 kW. Due to the wide variation in the range of power provided in the described embodiments, provided herein are feedback electronics and techniques to monitor and/or control the need for power (i.e., the presence of a device), the amount of power (which may be variable based on the device present), the timing of the providing of power, and various like and related factors that will be understood to those skilled in the art in light of the instant disclosure.

Figure 2:
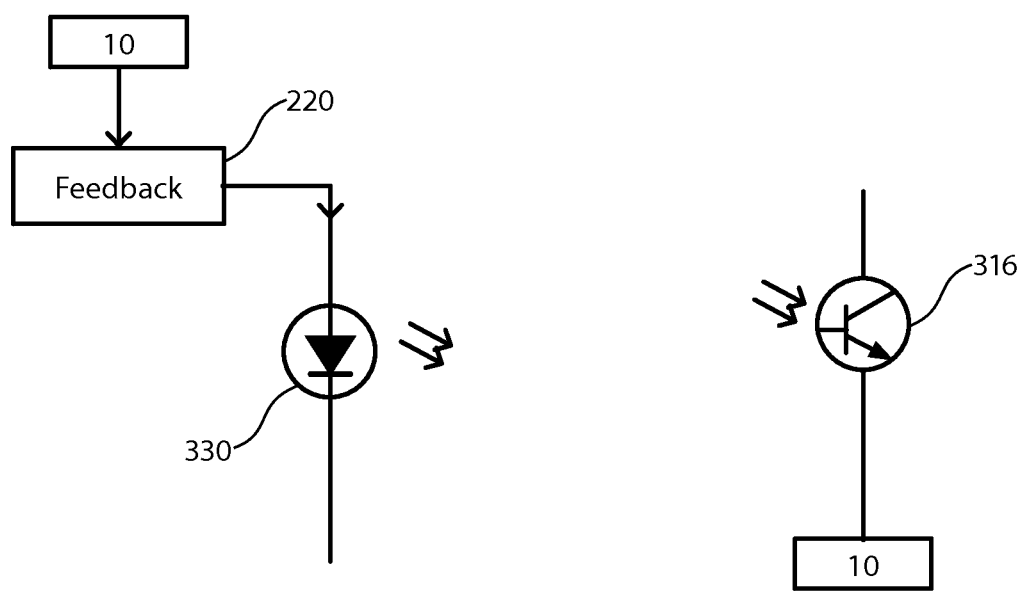
FIG. 2 illustrates an infrared transmission and reception system.

By way of non-limiting example, the present disclosure provides an exemplary infrared ("IR") feedback system and method, which may be employed in conjunction with inductive energy transfer. Those skilled in the art will appreciate, in light of the disclosure set forth herein, that ones of the described feedback systems may be employed in a wireless power embodiment, or may be employed in wired power embodiments to provide power feedback for devices/appliances. Thus, the power provided to the secondary 10 by the primary 12 may be the result of feedback provided by a paired infrared transmission and detection system. In particular embodiments, IR transmitters may reside in a powered device/appliance, and IR detectors may reside in the housing in which the primary coil is present. An exemplary paired system of infrared transmitter diodes 330 and infrared detection diodes 316 is shown in FIG. 2.

In an exemplary embodiment of infrared feedback in a wireless power embodiment, a feedback signal 220 is generated using infrared photodiodes and detectors 330/316 to control inductive energy transfer from primary 12 to secondary 10. Of course, as those skilled in the art will appreciate from the disclosure herein, feedback may also include, discretely or in combination with the aforementioned infrared feedback, indicator signals and/or feedback from or using NFC, RF (such as 900 MHz or 27 MHz), visible light, wires communicatively interconnecting primary and secondary control systems, and combinations thereof. It may be preferable to at least partially electrically isolate particular ones of the foregoing feedback systems (other than infrared) from the inductive power generation, such as in order to avoid interference and ensure proper operation. Infrared feedback may be particularly advantageous to provide feedback in particular wireless power embodiments, at least because infrared feedback will typically not require the aforementioned electrical isolation from the inductive power generation discussed herein.

More specifically, in an exemplary embodiment implemented using infrared feedback, an infrared transmitting diode 330 or diodes may be paired with an infrared detecting diode or diodes (such as in a one to one, one to many, many to one, or many to many configuration) to produce a feedback signal from the transmitting to the receiving diode or diodes, thus providing a closed electronic feedback loop for controlling the power produced in the secondary of an inductive energy transfer system. This embodiment allows the mechanically and electrically isolated control electronics of the secondary of the inductive energy transfer system to communicate with the control electronics of the primary of the system. Accordingly, if a particular power level is required at the secondary, the control electronics in the secondary may provide a signal to the control electronics of the primary via the infrared diodes to modify the power level that is being inductively transmitted.

In embodiments, the primary 12 and secondary 10 coils of the inductive energy transfer system are in close proximity to one other, but are mechanically and electrically isolated from one other. This isolation may be provided, for example, by a glass isolator of an inductive cooktop. Thereby, the presently disclosed embodiments may allow refined power control of the device that is receiving the induction energy transfer. This power is provided in a substantially noise free manner, and via the isolation boundary. Additionally, ones of the embodiments of the disclosure are highly configurable, and yet further may be very inexpensive beyond the typical base cost of an individual appliance.

In inductive energy transfer, the primary may operate as would an open air coil absent the presence of the secondary, hence delivering little to virtually no magnetic field. Embodiments readily allow for the use of infrared to indicate not only the presence of a device, thereby indicating the need to drive the secondary, but further to indicate the specific power requirements of the device. These power requirements may be modified in a typical manner, such as through the use of manual controls (i.e., using a potentiometer-type knob adjustment) on the device/appliance itself, wherein manual adjustment to the device controls on the device cause modification of the infrared signal indicative of the state of the secondary. Of course, such manual controls may also be located on the unit that houses the primary. In accordance with this modified feedback, the primary may increase or decrease the power delivery to the secondary. Likewise, control signals indicated via the infrared feedback may include on/off, faster/slower, more/less, hotter/colder, timing, etc.

In accordance with such control and feedback, simplified, or more complex, handshaking may be performed. That is, limitations may be placed on the type of device/appliance having a secondary that is accepted for interaction with the primary, and/or handshaking may allow for the exchange of information between the device/appliance and, for example, a cooktop housing the primary. For example, only appliances that are compatible with or that have the same branding as a cooktop that houses the primary may interoperate with the primary. Needless to say, those skilled in the art will appreciate in light of the instant disclosure that, in other embodiments, all or certain brands or models may also interoperate. Interoperability may be indicated on packing, on physical units, or the like.

Of course, as the housing of the primary often includes microprocessing capabilities, inclusion of a microprocessor in the device including the secondary may allow for more complex handshaking, information encoding, and the like. Such more complex handshaking may also occur over, for example, the aforementioned infrared transmission/detection, or may include, for example, other data exchange means. Data exchange means may include NFC, RF, visible light, and wired (such as RCA jack in the primary) or proprietary wired connections.

Figure 3:
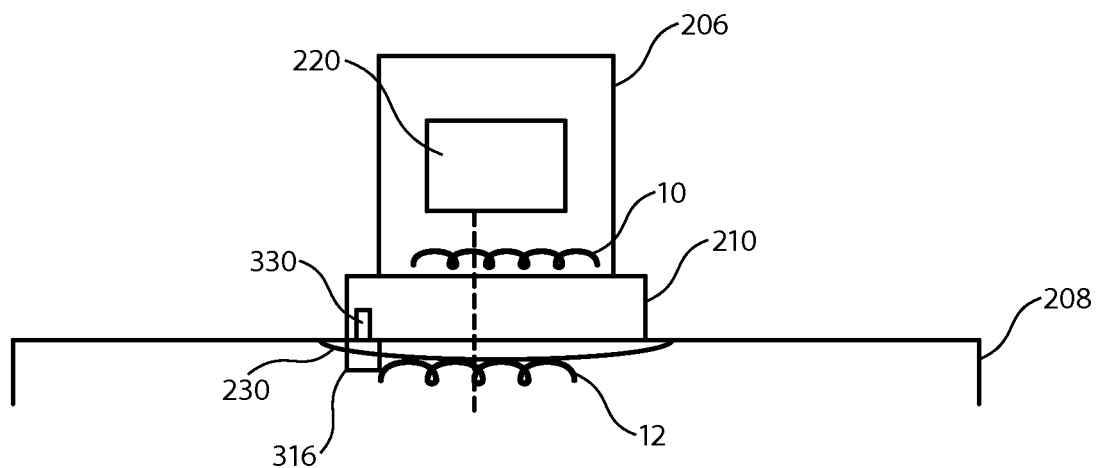
FIG. 3 is a diagrammatic illustration of a kitchen appliance resident upon a primary coil housing.

FIG. 3 is a diagrammatic illustration of a kitchen appliance 206, i.e., a blender, resident upon a primary coil housing 208, i.e., a cooktop, that includes a primary coil 12 for providing inductive power. Those skilled in the art will appreciate that the exemplary embodiment of FIG. 3 is illustrative only, and does not limit the applicable scope of the description herein. For example, the appliance 206 as shown may comprise any appliance or device in need of operative power, charging, recharging, or power conversion, and may include a base 210 or no base, wherein such a base 210 may or may not include an infrared or other feedback mechanism, and/or may or may not include a secondary 10. That is, the secondary 10 may be resident within the device or appliance 206, or within the device base 210. By way of non-limiting example, appliance 206 may be a blender, coffee maker, cellular device, battery operated device, a device having a non-nationally compliant plug, a cooktop, a pizza oven, etc.

Base 210, where present, may be permanently or temporarily connected or connectable to device 206. Further, base 210 may be dedicated for a particular device, or may be universal or semi-universal in that base 210 may interoperate with multiple different devices 206. Moreover, base 210 may itself, once powered by secondary 10, serve to provide one or more "plug-in" power outlets for other appliances or devices not capable of, or not desired for, receiving wireless power. The wired one or more plugs provided in base 210 in such embodiments may be standard plugs, or may be proprietary plugs, and/or may allow readily for use of multiple different types of plugs therein.

Figure 4:
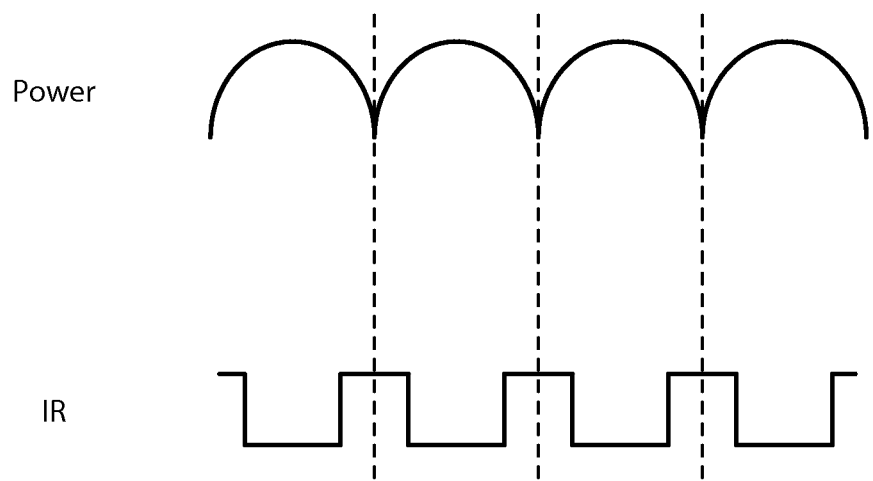
FIG. 4 is a signal diagram of an IR signal that is reflective of rectified received power.

In the illustration, power provided from the primary and induced in the secondary is controlled by the infrared feedback system 220. The infrared feedback system 220 may provide signaling, as indicated by a controller for the secondary, to the controller for the primary. This signaling may provide simplistic handshaking, such as on/off, higher/lower, hotter/colder, or more complex handshaking, such as might be indicated by inclusion of appliance 206 and/or housing 208 in the Internet-of-things ("IoT"). This handshaking signaling may be provided in any form known to those skilled in the art, such as modifications to pulse width, frequency, amplitude, or the like, of the outgoing IR signaling 330. This handshaking may be performed, at least in part, via one or more microprocessors in communication with, or within, feedback system 220, which microprocessor(s) may reside in either or both of the appliance 206 and the housing 208. Further, the signaling may be directly indicative of the power received by or requested at the secondary coil. By way of non-limiting example, an IR signaling that is indicative of the rectified received power at the secondary coil is shown in FIG. 4. The IR system may include sufficient modifications to allow for consistent signaling notwithstanding movement of appliance 206, such as sufficient view fields by the IR detector diodes 316, sufficient send angle for IR photodiodes 330, optics resident in appliance 206, optics resident in housing 208, and like modifications.

Moreover, it will be understood that the interoperation of the feedback system 220 with respect to IR diode(s) 330 and IR detector(s) 316 may be independent of the location of either IR diode 330 or IR detector 316 in relation to coils 10, 12. This is, in part, due to the fact that the IR diode/detector 330/316 does not generally suffer from interference due to interoperation of the inductive coils 10,12. Additionally, multiple secondary coils 10 may reside within appliance 206 and/or base 210, such as for interoperation with one or more primaries 12.

It will be appreciated that housing 208 may be or include nearly any surface suitable for inclusion of primary coil 12. By way of non-limiting example, housing 208 may be or include a countertop, a cooktop, a table, or the like. Further, any housing may include one or more primary coils 12 in portions or along the entirety thereof, preferably with sufficient space therebetween to allow for discrete operation of appliances 206 on individual ones of the coils. Moreover, housing 208 may or may not include thereon visual indicia 230 indicating the presence of primary coils therein, or indicating the precise or approximate location of primary coils therein. As inductive power may be moisture resistant/proof and condition agnostic, housing 208 need not include waterproofing, weatherproofing, or the like in order to protect the inductive power system—although such protections may be provided.

Figure 5:
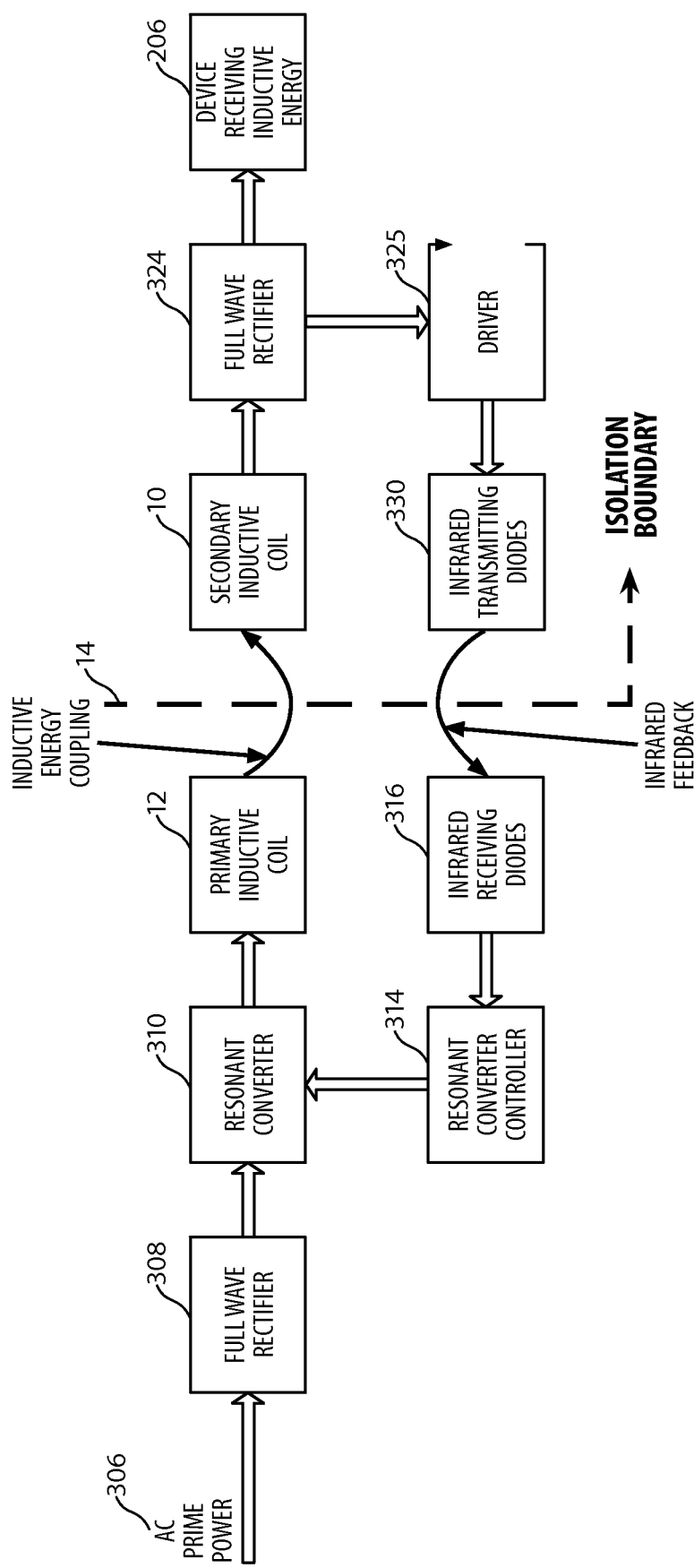
FIG. 5 is a block diagram illustrating an exemplary inductive power and feedback system in accordance with the disclosure.

FIG. 5 is a block diagram illustrating an exemplary system in accordance with the disclosure. As illustrated, the primary coil 12 receives "wired" power 306 (which may be rectified 308, or otherwise filtered or modified 308) in accordance with a frequency indicated by resonant converter 310. Resonant converter 310 may be controlled by controller 314 according to IR signaling received at IR receiving diodes 316. Controller 314 may be or be included as part of a microprocessor controller system within the housing of the primary 12.

Secondary coil 10 has induced therein power responsive to the current in primary coil 12. This power may be rectified 324 and provided as operative/charging power to device 206. Additionally, after processing 324 (such as rectification 324) or without processing, and with or without provision to a device controller 325, an indication of the power received may be provided to IR transmitting diodes 330 for feedback signaling to IR receiving diodes 316. Once received, this IR signaling may cause modification to the power to primary 12, which may, in turn, cause modification to the power induced at secondary 10 and passed to device 206.

Those skilled in the art will appreciate that processing and filtering of the power provided or induced, and hence of the electronics resident in appliance 206, for example, may vary based on the needs of the device or based on devices to be operated. For example, certain devices may require AC power, certain may require DC power, and some may operate with either AC or DC, and signal processing electronics may vary accordingly and still fall within the spirit and scope of the disclosure.

Figure 6:
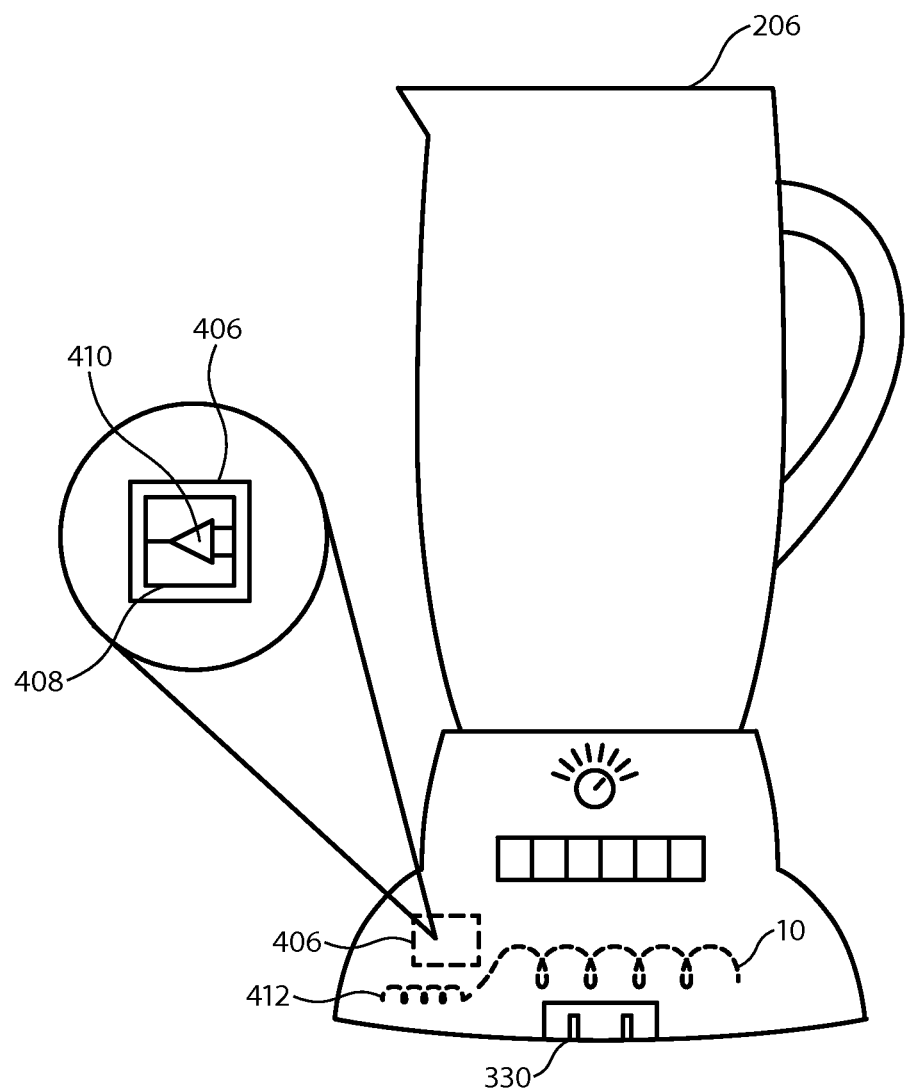
FIG. 6 illustrates a block diagram of an appliance according to the disclosed embodiments.

FIG. 6 is an exemplary illustration of an appliance having therein a secondary 10, IR transmitting diodes 330, and a device controller 406. Device controller 406 may specifically be or include, for example, IR transmitting diode controller 408.

Diode controller 408 may include, for example, a comparator 410 that assesses the received power at secondary 10. In exemplary embodiments, this received power may be directly taken from secondary 10. In other exemplary embodiments, device 206 may include one or more housekeeping coils 412 which may, for example, receive power from primary only as a percentage of the power induced in secondary, i.e., housekeeping coil 412 may include fewer windings, such as 4 windings, than secondary 10, but may be placed along with secondary 10 in the presence of primary 12 in order to have induced therein a current indicative of the current produced in secondary 10. The housekeeping coils 412 may, in fact, be provided simply as additional windings of the secondary 10.

Figure 7A:
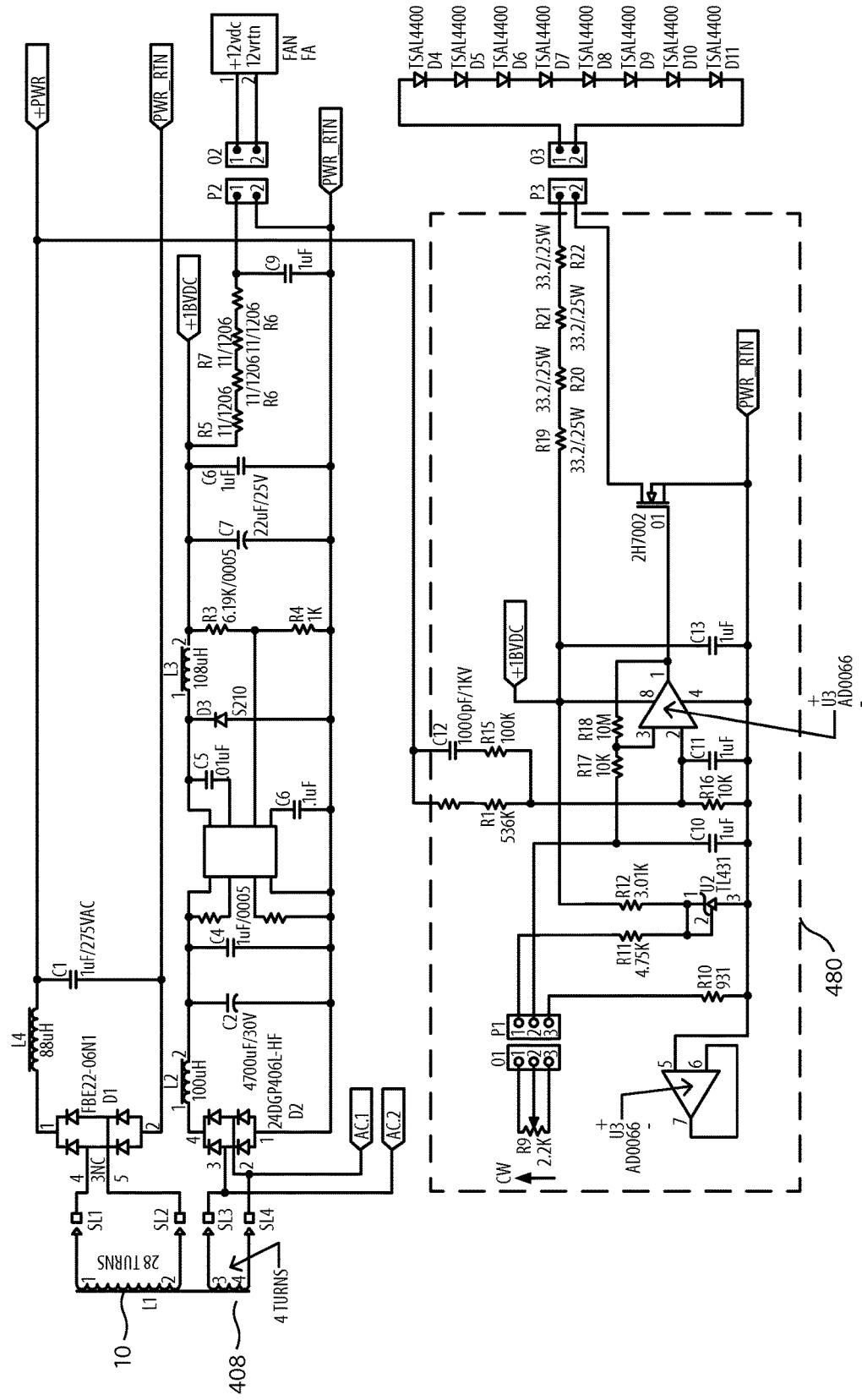
FIGS. 7A and 7B are schematic diagrams illustrating aspects of the disclosed embodiments.
Figure 7B:
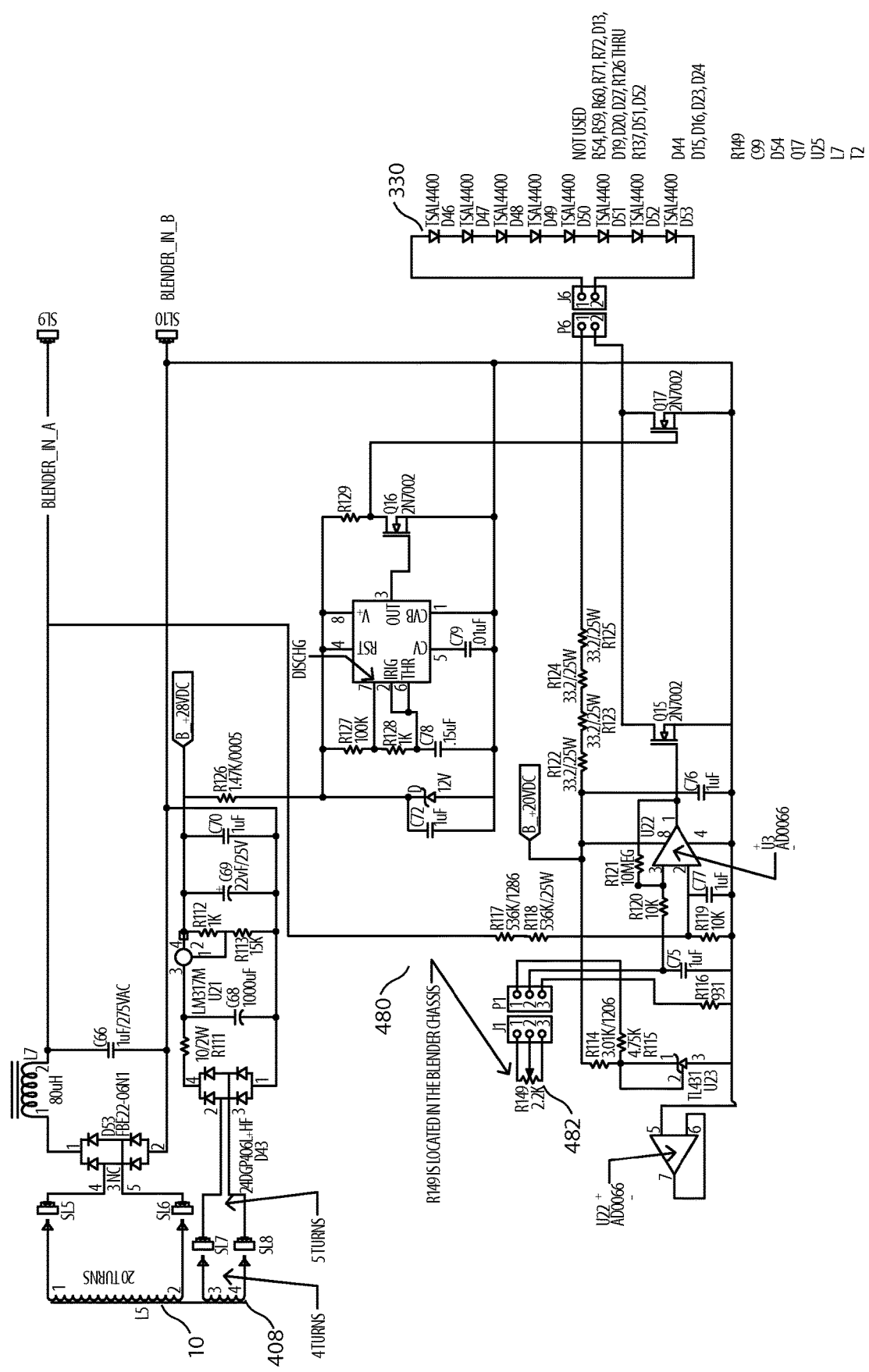

FIGS. 7A and 7B provide a detailed schematic illustration of a particular exemplary embodiment of the disclosure. Illustrated in FIG. 7A are a secondary winding 10 and a housekeeping winding 412. Also illustrated is the IR feedback loop 480, which drives a plurality of IR photodiodes 330. FIG. 7B illustrates a particular secondary winding 10, housekeeping winding 412, and IR photodiode 330 configuration suitable for use in an exemplary blender 206 embodiment. Further illustrated is a potentiometer 482 suitable for adjusting the power to secondary 10.

Figure 8A:
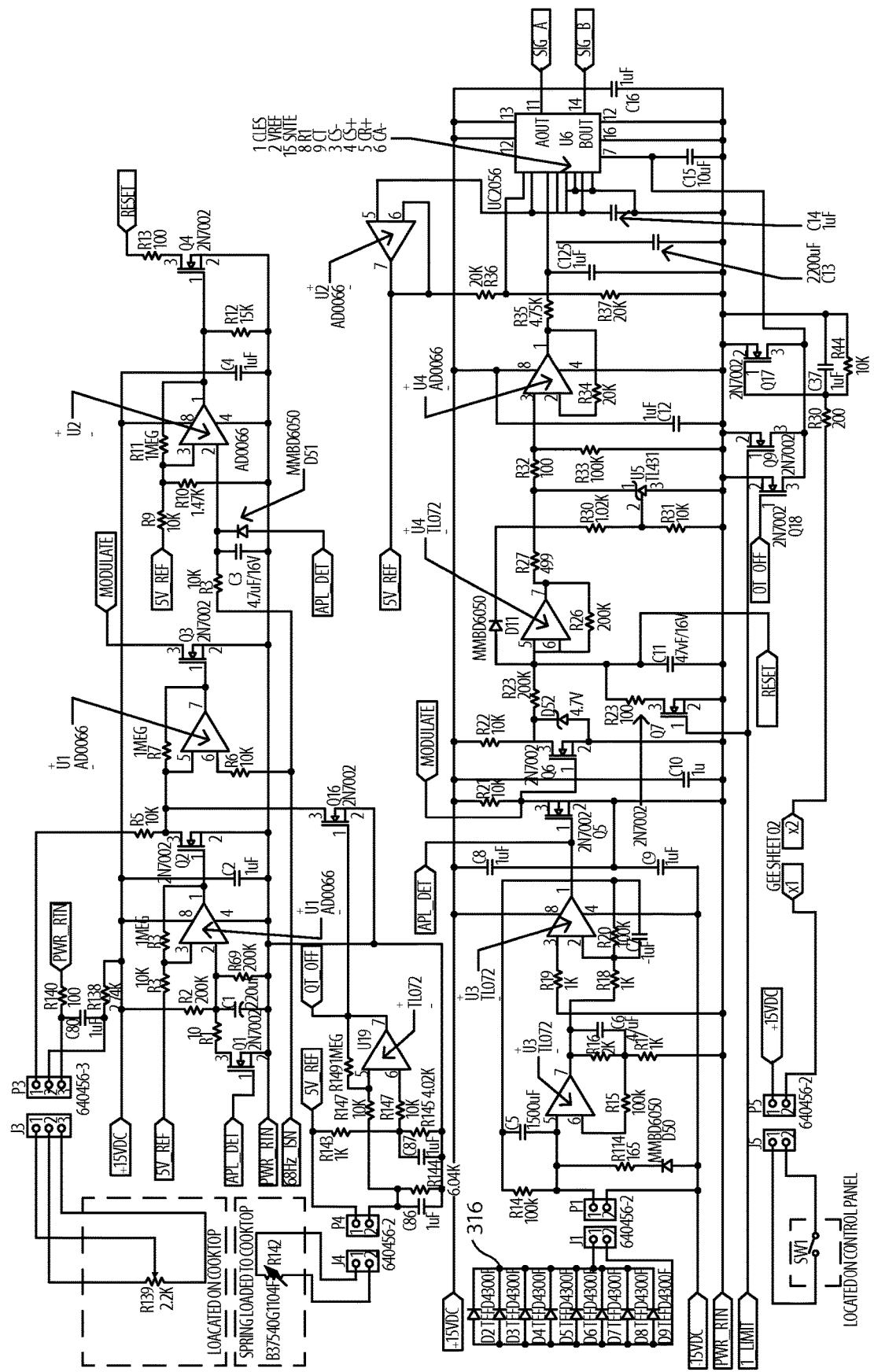
FIGS. 8A, 8B and 8C are schematic diagrams illustrating aspects of the disclosed embodiments.
Figure 8B:
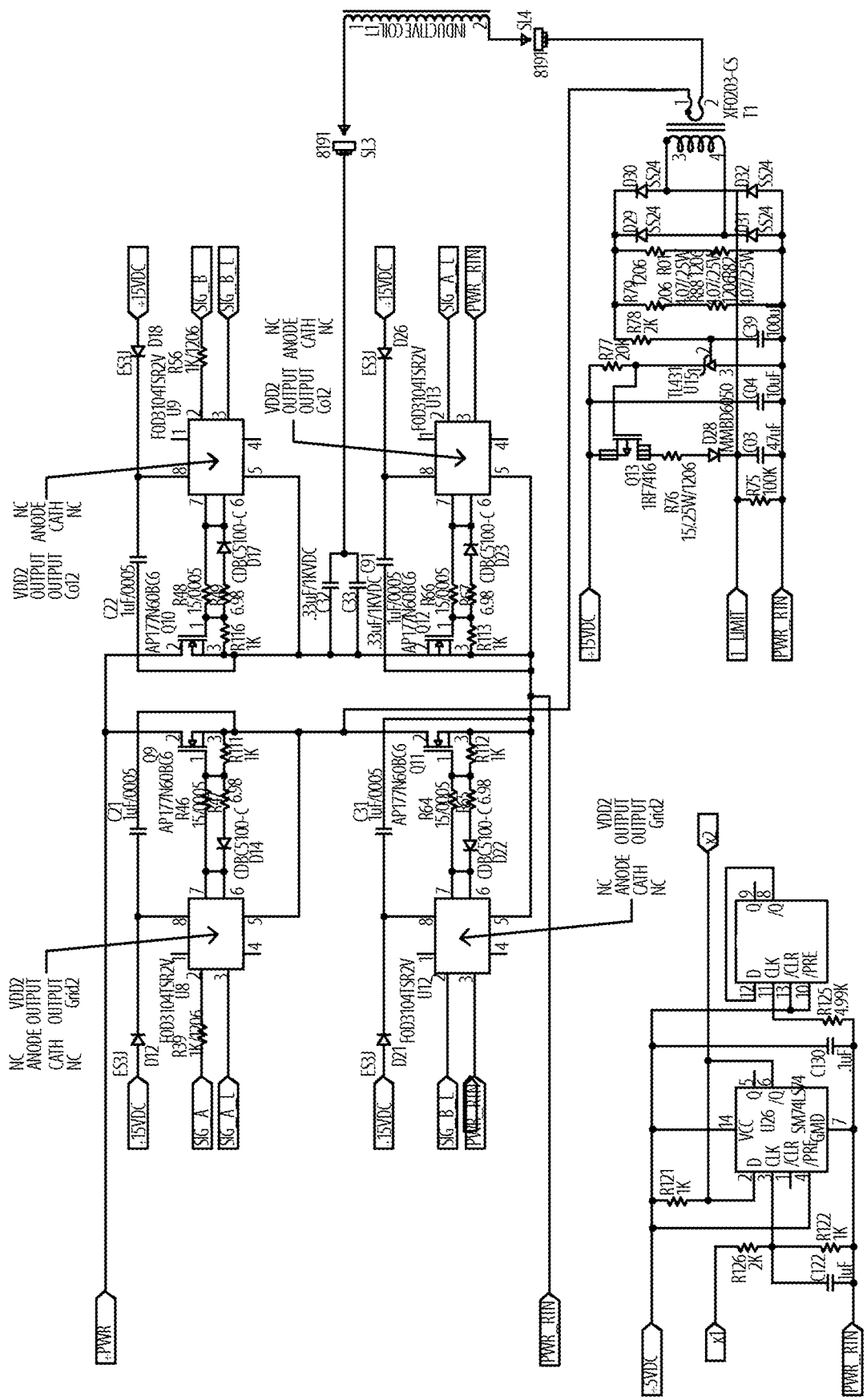
Figure 8C:
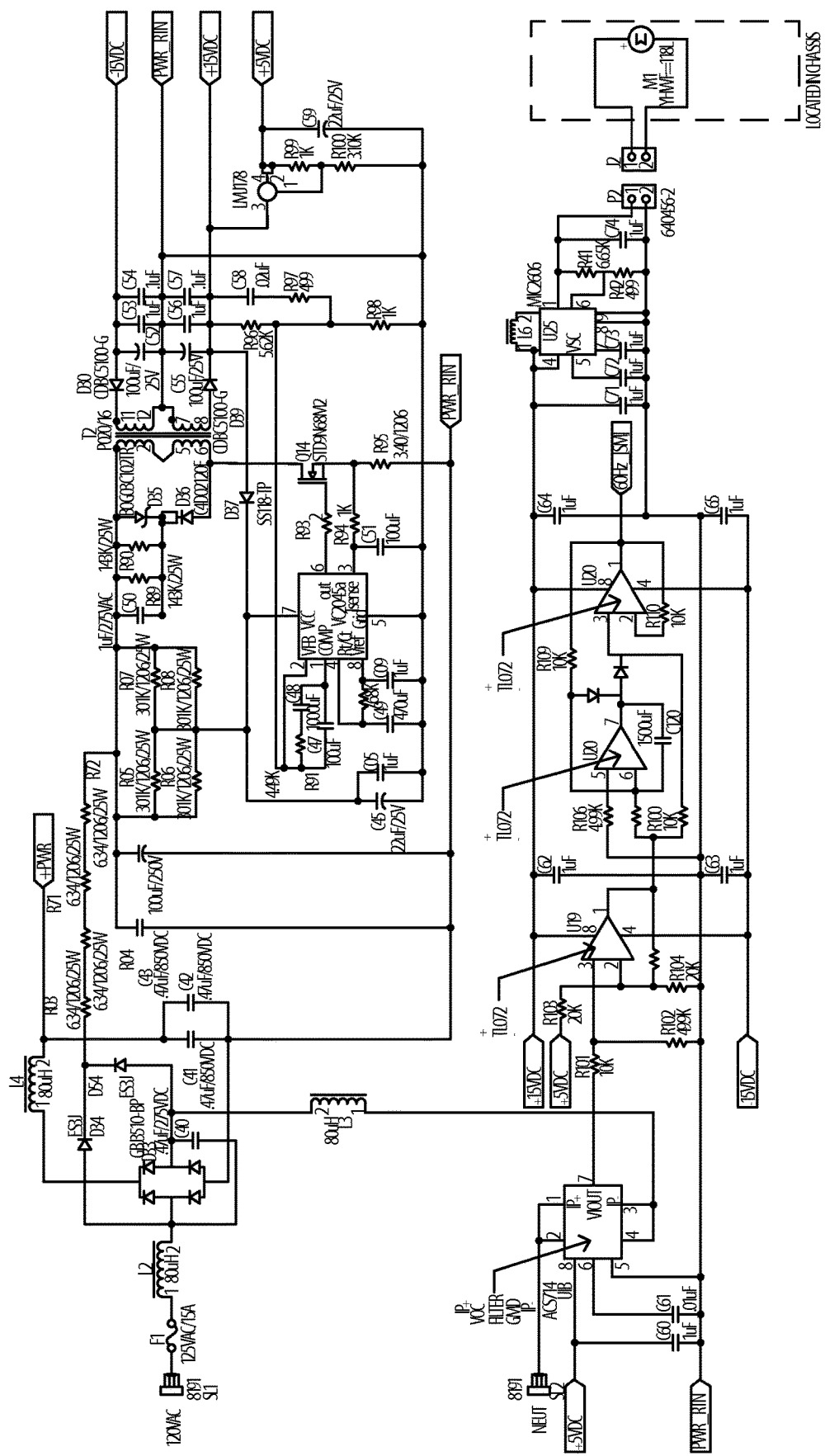

FIGS. 8A, 8B and 8C are schematic diagrams illustrating driver circuitry for an exemplary primary 12. In the illustration, primary 12 is driven responsive to received input at IR detector diodes 316. IR detector diodes 316 may receive input from IR photodiodes 330, and may accordingly modify the power at primary 12. Accordingly, the power at secondary 10 is modified based upon the modification at primary 12.

Returning now to FIG. 6, the indication of power produced at secondary 10 may then be provided to diode controller 408. Diode controller 408 may indicate, for IR signaling purposes by IR transmitters 330, that the power at primary 12 be modified. This will, in turn, modify the power at secondary 10. That is, diode controller 408 may receive the indication of the power at secondary 10, and, to the extent the power is not that which is desired, or to the extent the desired power for the device 206 has been modified (such as via adjustment to a manual controller), diode controller will vary the signal sent by IR transmitting diodes 330.

Thus, power feedback may allow for any needed modification to supplied power. This enables refined control of supplied power, and accordingly the disclosed embodiments may allow for trickle charging of a cellular device (on the order of ~10 W or less delivered) as well as or in place of the provision of operative power (on the order of up to 4.5 kW delivered). The need to modify supplied power may include the presence of an appliance and the consequent need to supply power to secondary 10. That is, in the same manner in which a conventional conductive cooktop may provide a small amount of power at the primary 12 in order to detect presence of an appliance (i.e., the primary acts as an air core inductor and thereby provides on the order of 0.25 A at 100 kHz, but the presence of a pan, for example, modifies the inductance of the circuit, hence changing the frequency and causing delivery of on the order of 1.5 A), the present disclosure may provide a small amount of power at the primary 12 sufficient to stimulate the IR transmitting diodes 330 in appliance 206 in order to detect the presence of appliance 206 and the consequent need to drive secondary 10. Similarly, this small amount of primary current may induce sufficient current feedback in the housekeeping coil 412 to stimulate the device 206 to demand more power, such as via transmitting diodes 330. Of course, those skilled in the art will appreciate that suitable safety electronics, such as one or more thermistors, may be present in the housing to ensure no overheating or misheating occurs.

Figure 9:
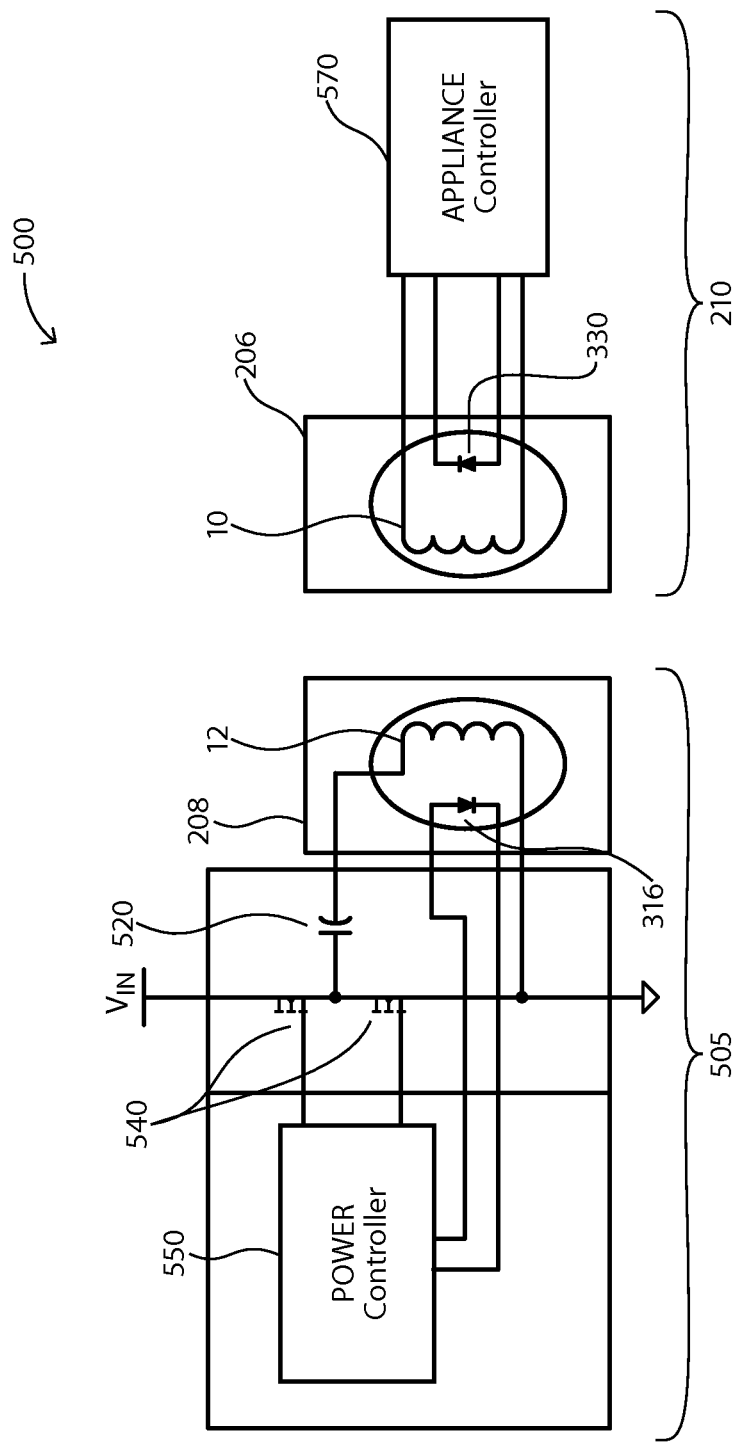
FIG. 9 is a schematic diagram illustrating aspects of the disclosed embodiments.

Referring now to FIG. 9, a particular exemplary embodiment of an induction power supply system 500 is illustrated, and may include an induction work coil 510 and capacitor 520 that form a series resonant circuit. In an embodiment, the resonant circuit resonates at a high frequency, such as 30 kHz. The resonant circuit is energized from a controllable power source, VIN. In an embodiment, the primary coil 12 is part of a power unit 505 that has a non-magnetic work surface, such as a table with a wooden top, or a kitchen range with a cook top made of suitable nonmagnetic material, such as glass or ceramic, as discussed herein. Secondary coil 10 is placed in close proximity to the primary 12 and is energized by magnetic induction from the primary coil 12. The primary coil and the secondary coil may be multi-turn (for example 30 turns) spirally wound pancake coils. The primary may be mounted on the underside of a surface of the primary housing 208, such as the aforementioned cooking top, onto which appliance 206, such as an electric coffee maker, may be placed.

Secondary 10 may be mounted in the bottom of appliance 206, or in base 210 to which appliance 206 may be coupled. Thereby, the appliance's secondary coil 12 is magnetically coupled to the primary coil 10, and can provide power to operate the appliance using currents induced in the secondary.

Semiconductor switches 540 may form an oscillator. The oscillator is shown as a half bridge-type oscillator, although other types and/or configurations of oscillator may be used and the same general principles of operation will apply. The oscillator switches 540 and/or the input voltage VIN may be controlled by power controller 550, such as in response to a feedback signal. The feedback signal may be provided by a signal transmitter, such as infrared LED 330, to a signal receiver, such as infrared photodiode 316. In the exemplary embodiment as shown, primary coil 12 and IR receiving photodiode 316 may be contained in housing 208, and secondary coil 10 and LED 330 may be contained in assembly 206/210. The LED and photodiode may be arranged so that the light from the LED shines more or less on the photodiode, although between the LED 330 and receiving photodiodes 316 may be optics or the like, such as in order to increase the view field of the IR feedback system and as discussed hereinabove.

In embodiments, an array containing a plurality of LEDs, such as six LEDs arranged in a regular hexagon, may be disposed on the bottom of the appliance, and a plurality of photodiodes similar in number and/or arrangement, may be optically exposed to the work surface under which the work coil is mounted, such as to better ensure that the signals sent by the LEDs are received by the photodiodes. In such a configuration, at least one, two, or more LEDs may be required as visible to receiving photodiodes. Additionally, either or both of IR diode(s) 330 and IR detector(s) 330 may be placed anywhere within the view field of one another, including within and/or within the field of coils 10/12. Further, in embodiments having an array in the IR feedback system, a one-to-one correspondence to enable operation may or may not be required.

In the exemplary embodiment, the semiconductor switches 540 are coupled to power controller 550. Although other arrangements may be used, as shown the gate electrodes of the switches are coupled directly to the power controller, the drain of the top switch is connected to VIN; the top switch's source is coupled to the bottom switch's drain, and the bottom switch's source is coupled to ground.

In a series resonant circuit, current is maximum at resonance and therefore the resonant circuit is preferably operated proximate to resonance by the power controller. To transfer energy from the primary coil to the appliance coil, high frequency oscillations of the magnetic field set up by the substantially resonating primary coil 12 induce currents in the appliance coil 10, thereby providing power to the appliance coupled thereto. The power to the appliance is controlled by varying the primary coil frequency. Control of the primary coil 12 current, and hence the appliance coil 10 current, may be effected by power controller 550 varying the frequency of the oscillator.

Control of the frequency and magnitude of the voltage applied to the appliance may be effected by using a full wave rectifier (not shown) to produce DC from the high frequency AC induced in the appliance coil, and an AC inverter (not shown) coupled to the rectifier. The output of the appliance coil may be full wave rectified and fed through the inverter to produce a sine wave. The sine wave may be amplitude controlled in any appropriate manner, for example, from 85 VAC to 265 VAC. However, the output power is limited by the capability of the primary coil 12. The output frequency provided by the appliance controller may be adjusted to match the mains frequency, which may be the frequency of the voltage to the circuit that produces the VIN.

Appliance controller 570 determines the level of energy needed to satisfy the requirements of the controls of the appliance (not shown). The appliance controls may be disposed on the appliance, or may be otherwise disposed, such as on an appliance base that contains the appliance coil, or on the working surface containing the work coil. In an embodiment, the appliance controller activates the infrared LEDs and sends data that is received by the photodiodes and forwarded to power controller 550. The power controller uses the received information to modify the energy supplied to the system to conform to the requirements of the appliance controls, for example, by varying the duty cycle and/or the frequency of the current supplied to the primary coil 12 in response to the commands of the appliance controller.

In embodiments, the data sent using signaling by the infrared diodes may be related to PWM data to control the duty cycle of the oscillator, frequency data to control the frequency of the oscillator or inverter, and the like. The data may be sent in standard packets so that appliances and working surfaces/coils providing power may be made by different manufacturers. Alternatively, the data may be sent in proprietary packets to ensure a single manufacturer produces both the appliances and the working surfaces/coils. For example, various packet structures and lengths may be used, such as 8 bit or 32 bit packets. Moreover, machine intelligence may be provided in the system to coordinate the operation of the power controller 550 and the appliance controller 570.

Figure 10:
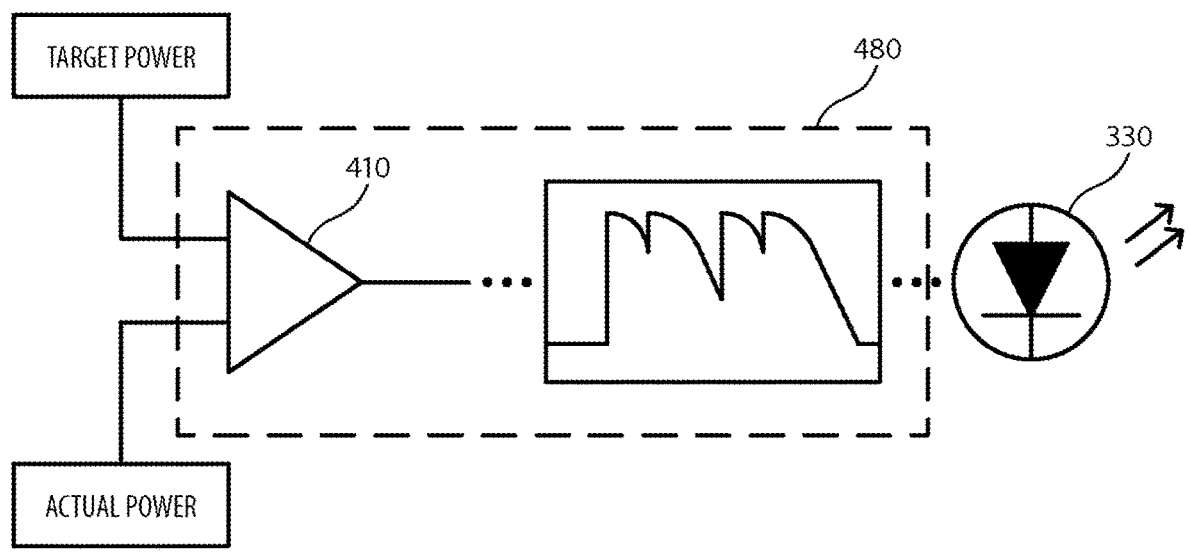
FIG. 10 is a schematic block diagram illustrating aspects of the disclosed embodiments.

FIG. 10 is a block signaling diagram indicating exemplary signaling by IR transmitting diodes 330. This signaling may, for example, be the modified signaling provided upon sensing of a change by the diode controller 408 of FIG. 6. As shown, comparator 410 may compare the received power to the desired power, and may operate the IR transmitting diodes 330 as a ripple converter. That is, provided may be a "ripple control," wherein IR diodes may be activated when power is insufficient at secondary coil 10, and accordingly power may increase, and the IR diodes may be deactivated when power is overly sufficient, and accordingly power may decrease—thereby creating a "ripple" of the power produced at secondary 10 around the desired voltage. More particularly, the comparator 410 may assess the power at secondary 10, and may turn on, or pulse for a pulse duration, transmitter diodes 330 when the power at secondary 10 is insufficient, and may turn off transmitter diodes 330 when the power at secondary 10 is sufficient. The periodicity of the IR signaling may synchronize with the received power, such as with the 60 Hz signal of the induced power at secondary 10 if the wired power at primary 12 is provided at 60 Hz.

Accordingly, the devices, systems and method provided by the instant disclosure may be independent of supplied frequency and other electrical supply factors. Thereby, devices, systems and methods provided herein may be "universal" in that they are readily transferable between environments and countries. This would, of course, allow for construction and manufacturing of devices for use in the instant disclosed embodiments without need for modification (such as different plugs) for different markets.

Moreover, the signaling indicated herein, such as that of FIG. 10, may be encoded, such as by device controller (406)?doesn't show up on FIG. 10. By way of non-limiting example, device controller 406 may encode or otherwise modify IR (and other) signaling in order to avoid interference with other IR-based control systems, such as television remote controls, that may share the environment with the disclosed inventive embodiments.

Figure 11:
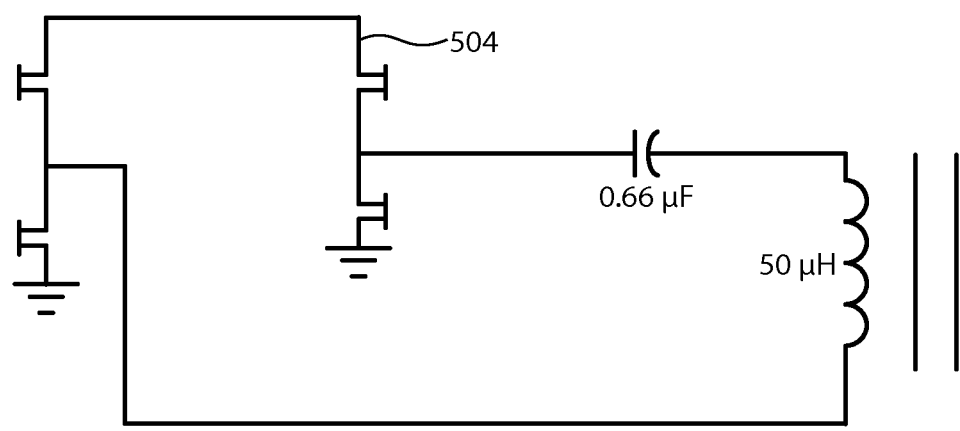
FIG. 11 illustrates an exemplary driver circuit for a primary coil.

FIG. 11 illustrates an example of a specific driver circuit 502 for a primary 12. The driver circuit as shown includes a full bridge 504. The circuit 502 is an example of a driver circuit that allows primary 12 to run higher than resonance, in order to allow persistent power flow through primary 12.

Figure 12:
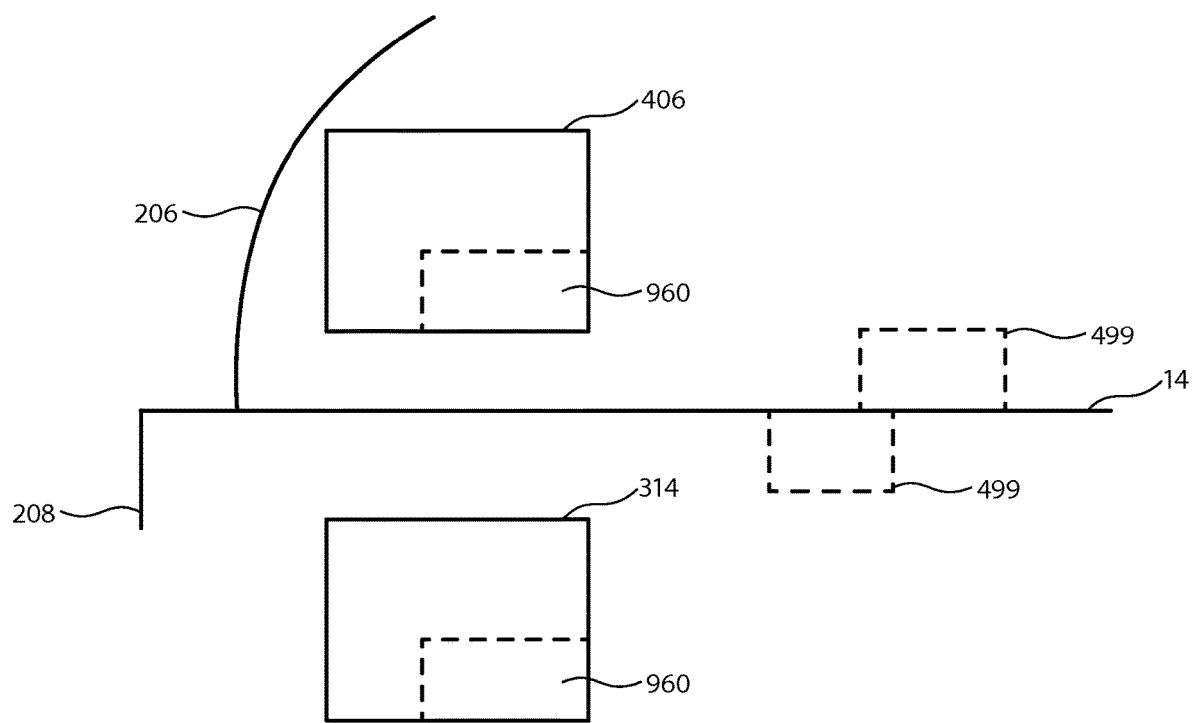
FIG. 12 is a block diagram illustrating aspects of the disclosed embodiments.

FIG. 12 is a block diagram illustrating device controller 406, and primary housing controller 314. As illustrated, either or both controllers 314, 406 may optionally interoperate with non-IR feedback systems. By way of non-limiting example, either or both controllers may include wireless communication capabilities 960, such as using RF, Bluetooth, IR, WiFi, NFC, or similar communication methodologies 499. Likewise, to the extent the wireless communication capabilities are resident only in the housing associated with one of the controllers 314, 406, such as within the primary housing, a wire, plug, or the like may allow for communication between controllers 314, 406 to thereby allow for wireless communication by the device not including the wireless communication capability therewithin.

Capabilities 960 may thus allow for detailed handshaking and data exchange between device 206 and housing 208. As such, communications using capabilities 960 may be packetized, encoded, or the like. The wireless communication capabilities may also allow for information to pass not only between device 206 and housing 208, but further may allow for information and data to pass between device 206 and housing 208 and the environment associated therewith. By way of example, capabilities 960 may allow for communication with a local area network (LAN) or wide area network (WAN) interconnected with the Internet, an intranet, an extranet, the cellular network, a satellite, or the like. This may allow, for example, for "membership" of the device 206 and/or the housing in the IoT.

For example, housing 208 may include network communication capabilities. In such a case, if appliance 206 does not include networking capabilities (or is unable to use such capabilities, if present), appliance 206 may communicate, via the feedback discussed herein, with the control electronics for housing 208, thereby accessing networking capabilities via the networking capabilities of housing 208 under control of the microprocessing capabilities therewithin.

Communicative connection to the IoT may allow, for example, for remote, timed, or like actuation of devices 206 physically adjacent to housing 208. Similarly, use-tracking may be performed, such as assessing, for example, that an owner uses a certain brand of blender 3 times each week. Additionally, recipes may be practiced via download to a device (and may or may not include sensing of ingredient additions), and/or other devices may be actuated based on use of a first device (i.e., an oven may be turned on to preheat while a cake batter is being blended in a blender). As such, participation in the IoT may allow for combination cooking (i.e., a mixer within a pot), and/or may allow for interoperation of wireless devices 206 in accordance with this disclosure with other wired or wireless devices that do not operate in the inductive and feedback systems and methods discussed herein.

Figure 13:
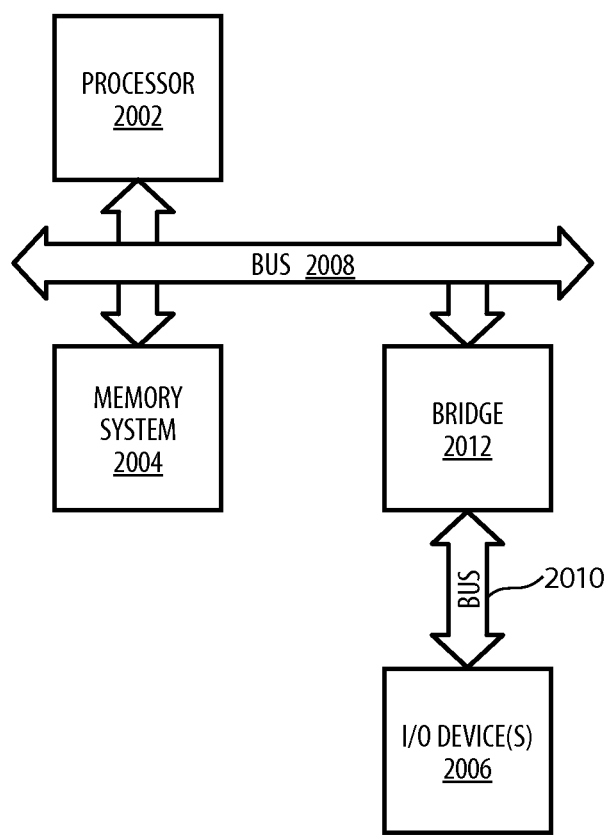
FIG. 13 is a block diagram illustrating aspects of the disclosed embodiments.

Reference is made throughout to microprocessor-based control, and, in some embodiments, microprocessor-based network communication. FIG. 13 is a simplified functional block diagram of a microprocessor-based system 2000, which may be referred to herein as simply a microprocessor. The functional descriptions herein indicated as microprocessor-based may be implemented in hardware, software or some combination thereof. For example, the controller resident in housing 208 may be implemented using a microprocessor-based system.

As shown, the system 2000 may include a processor 2002, a memory system 2004 and one or more input/output (I/O) devices 2006, communicatively connected by a communication 'fabric'. The communication fabric can be implemented in a variety of ways, and may include one or more computer buses 2008, 2010, and/or bridge and/or router devices 2012. The I/O devices 2006 may include network adapters and/or mass storage devices from which the microprocessor system 2000 may send and receive data for generating and transmitting information, including transmission and reception via a network interface I/O. That is, system 2000 may be in communication with the Internet via the I/O devices 2006.

The various illustrative logics, logical blocks, "microprocessing," and modules described in connection with the embodiments herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, the steps and/or actions of methods, logic, or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of instructions on a machine readable medium and/or computer readable medium.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but rather is to be accorded the widest scope consistent with the principles and novel features disclosed.

What is claimed is:

1. A system for receiving operating power at a battery-less appliance necessitating the operating power in a range of about 1 kW to about 4.5 kW, comprising:
   a secondary coil within a housing physically associated with the appliance and suitable for providing induced operative alternating current when isolated from, in magnetic proximity to, and responsive to a primary coil circuit in a glass cooktop having a full bridge driver circuit;
   an appliance controller coupled to the secondary coil, which is a member of an internet of things group and which is suitable to locally receive from a remote source waveform characteristics of a current waveform of the operative alternating current situationally required by at least the appliance of the group, and suitable to generate data indicators for processing and the induction of the operative alternating current according to the indication; and
   at least one infrared sensor system communicatively coupled to the appliance controller and to at least one data receiver of the primary coil and suitable to wirelessly exchange ones of the data indicators between the appliance controller and the at least one data receiver associated with the primary coil to stimulate operation of the primary coil to produce the current waveform having the waveform characteristics of the operative current in the secondary coil.

2. The system of claim 1, further comprising a secondary sensor communicatively coupled to the appliance controller and suitable to transmit other ones of the data indicators.

3. The system of claim 2, wherein the secondary sensor comprises one of a static presence indicator, radio frequency switch, wired switch, Bluetooth switch, visible light switch, and NFC switch.

4. The system of claim 1, wherein the appliance controller further comprises a safe operation detector suitable to monitor the operative current.

5. The system of claim 1, wherein the current waveform of the operative current is indicative of at least one of minimum power, maximum power, speed, heat, timing, and display brightness of one or more aspects of the appliance.

6. The system of claim 5, wherein the appliance is one selected from the group consisting of a blender, toaster, coffee maker, networked device, display, pan, pot, can opener, grill, hibachi, cooler, chiller, juicer, cooktop, oven, and cooking iron.

7. The system of claim 1, wherein ones of the data indicators comprise performance feedback.

8. The system of claim 1, wherein the housing comprises a base suitable for receiving the appliance.

9. The system of claim 8, wherein the base comprises a multi-prong plug receiver.

10. The system of claim 1, wherein ones of the data indicators comprise compatibility with the primary coil.

11. A system for providing operating AC power in a range of about 1 kW to 4.5 kW to a battery-less appliance, comprising:
- a primary coil circuit comprising a full bridge driver circuit that is within a cooktop that is physically separate from, and that comprises a glass surface that at least partially provides mechanical and electrical isolation from, a secondary coil physically associated with the appliance, wherein a primary coil of the primary coil circuit is suitable for inducing an actuating operative current in the secondary coil when magnetically proximate to the second coil;
- a primary coil controller coupled to the primary coil circuit, suitable to indicate a primary coil waveform to be provided at the primary coil based on a sensed appliance associated with the secondary coil, and suitable to locally receive from a remote source current waveform characteristics of the actuating operative alternating current situationally required by at least the appliance as a member of an internet-of-things group; and
- a feedback receiver within the housing and comprising at least an infrared sensor, and which is suitable to:
  - receive feedback data regarding a secondary coil operative power waveform induced in the secondary coil responsively to the primary coil waveform;
  - modify the primary coil waveform responsively to the feedback data.

12. The system of claim 11, wherein the feedback data comprises presence indication.

13. The system of claim 11, wherein the feedback data comprises performance indication.

14. The system of claim 13, wherein the feedback receiver further comprises at least one of a static presence indicator, radio frequency switch, wired switch, Bluetooth switch, visible light switch, and NFC switch.

15. The system of claim 13, wherein the feedback data is indicative of at least one of minimum power, maximum power, speed, heat, timing, and display brightness of one or more aspects of the appliance.

* * * * *